(12) United States Patent
Lang et al.

(10) Patent No.: US 7,448,765 B2
(45) Date of Patent: Nov. 11, 2008

(54) HOLDING ARM CONNECTION FOR EXTERIOR VEHICLE MIRROR ASSEMBLY

(75) Inventors: Werner Lang, Ergersheim (DE); Markus Meier, Markt Nordheim (DE); Stefan Centmayer, Ergersheim (DE); Ralf Wattenbach, Burgbernheim (DE); Jaap-Jan Snel, Bad Windsheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 35 days.

(21) Appl. No.: 11/593,686

(22) Filed: Nov. 7, 2006

(65) Prior Publication Data
US 2007/0103803 A1    May 10, 2007

(30) Foreign Application Priority Data
Nov. 7, 2005   (DE) ................ 10 2005 053 002

(51) Int. Cl.
G02B 7/182    (2006.01)
(52) U.S. Cl. ........................................ 359/879
(58) Field of Classification Search .......... 359/871–879
See application file for complete search history.

(56) References Cited

U.S. PATENT DOCUMENTS 4,394,066 A    7/1983    Sharp 5,268,797 A    12/1993    Santo
6,764,207 B2 *  7/2004    Abalos et al. ............... 362/487

FOREIGN PATENT DOCUMENTS

| DE | 2 303 688 | 8/1973 |
| DE | 37 40 485 A1 | 6/1989 |
| DE | 197 29 366 A1 | 2/1999 |
| EP | 0 383 355 A2 | 2/1990 |
| GB | 75 31 050 | 11/1979 |

* cited by examiner

Primary Examiner—Euncha P Cherry
(74) Attorney, Agent, or Firm—McNair Law Firm, P.A.

(57) ABSTRACT

An exterior vehicle mirror assembly is disclosed having a holding arm connection with reduced wind turbulence comprising a holding arm having a first end and a second end for attachment to the vehicle. A mirror head is carried by the holding arm having a mirror element. A connection device is disposed between the mirror head to the holding arm having opposing convex sides including a convex mounting side and a convex wind encountering side. The convex mounting side providing an enlarged mounting surface disposed toward the mirror head. The connection device has a contoured cradle for engaging the enlarged mounting surface of the convex mounting side of the holding arm with the opposing convex side of the holding arm being aerodynamically exposed to the on coming wind. A fastener tightly fastens the holding arm and connection device together so that a reliable connection with reduced turbulence is provided for the mirror head and the holding arm.

9 Claims, 5 Drawing Sheets

HOLDING ARM CONNECTION FOR EXTERIOR VEHICLE MIRROR ASSEMBLY

BACKGROUND OF THE INVENTION

This invention is directed to an exterior mirror assembly for motor vehicles, especially for commercial vehicles such as large trucks, busses, and agricultural vehicles and other utility vehicles.

Exterior mirror assemblies for commercial vehicles are relatively large, since, as a rule, several mirror elements and/or mirror heads combined with several mirror elements may be present. For this reason, the mirror heads with one or more mirror elements are often fastened onto a holding arm, for instance, steel tubing. The fastening of the mirror heads onto the holding arms is done by means of clamp fittings with a first and a second clamping part, which in combination, encompass the holding arm.

A clamp-type connection of this type is disclosed in EP 1 216 883 B1. In this case, the holding arm, which is constructed of steel tubing, partially penetrates the mirror head. Since the known clamp connection grips the steel tube from both sides, that part of the clamping part which is remote from the mirror head is often covered with an aerodynamically, streamlined covering, to avoid unpleasant turbulence at driving air speed and to prevent deposition of dirt on the mirror pane. Alternatively, trials have been made so that the second clamping part remains as small as possible and is kept smooth to diminish turbulence which could arise because of an uneven structure about the connection of the mirror head and the holding arm.

Thus, using EP 1 216 883 B1 as a background example, it is the purpose of the present invention to provide an improved connection for a holding arm and mirror head having increased stability; and wherein turbulence at the fastening connection of the mirror head to the holding arm is diminished.

SUMMARY OF THE INVENTION

The above objectives are accomplished according to the present invention by providing a holding arm having an oversized mounting surface deviating from the circular cross-section of the conventional tubing. That is, a surface of greater contact, between the connection apparatus and the holding arm. Due to this enlarged mounting surface, it no longer necessary to mount the mirror head upon one of the clamping connections which form the first and a second clamp-part. The side of the holding arm distant from the mirror head remains free from entrained and deposited materials, and disturbing turbulences of the driving wind are lessened. Air-turbulence is diminished by the convex shape of that side of the holding arm which is subjected to the wind engendered by driving. Due to the increased area of a resulting plane or a convex shape of the surface which faces the mirror head, there is generated a sufficiently large contact surface between the mirror head and the holding arm in order to assure a satisfactory stability.

An additional advantage has been created, in that the mounting of the mirror onto the holding arm is simplified, since principally, manual installation now occurs with the mirror head and not, as in the manner pursued as in the state of the technology, where the mirror head and the second clamping part are subjects of interest for the mounting operation.

In an oval, cross-sectional design of the holding arm the mounting surface, that is the functional contact surface, is enlarged between the connection device and the holding arm, as compared to that of the the purely circular cross-section. This advantage assures a sufficient "one-sided" only clamping stability of the mirror head on the holding arm, eliminating the need for a second clamping part on the other, wind-encountering side of the holding arm.

In accord with a preferred embodiment example of the invention, the holding arm possesses no sharp edges, that is, it is rounded off, so that disturbing turbulences are diminished.

In accord with another preferred embodiment of the invention, the holding arm is narrower in the direction of mounting than it is in a direction transverse thereto. This dimensioning provides an enlarged mounting surface and an increased stability between the mirror head and the holding arm.

In accord with a further preferred embodiment example of the present invention, the holding arm is convex shaped and is affixed to the vehicle at its two ends. This design increases the stability between the mirror head and the holding arm.

In accord with another preferred embodiment example of the invention, the holding arm is constructed as an extruded structural member, wherein its manufacture is simplified.

In accord with yet another advantageous embodiment of the invention, the holding arm is designed as a hollow structural member, especially as an aluminum hollow member. By means of the hollow characteristic the stability increases itself and the raw material aluminum combines a high degree of stability with a comparatively light weight.

In accord with a further preferred embodiment example of the invention, the holding arm is built in accordance with the methods of aerodynamics, i.e., streamlining, so that the oncoming driving air causes no further turbulence nor contributes to contamination.

In accord with yet another preferred embodiment of the invention, the holder arm is oval in cross-section. This establishes a simple aerodynamic shape and is easily manufactured.

In accord with another preferred embodiment of the invention, the holding arm is perforated with fastener bores so that the mirror head, by means of screws introduced through that side of the holding arm remote from the mirror head, is fastened to the holding arm and therewith is solidly bound. This practice enables a very simple mounting of the mirror head on the holding arm.

In accord with a preferred embodiment the side of the holding arm remote from the mirror head is covered with an elongated encapsulation cap. By means of this encapsulation it is possible, for instance, that the borings for the mounting of the mirror head on the holding arm can be covered so that disturbing turbulence can be avoided. Additionally, it is possible that the encapsulation be aerodynamically shaped Furthermore the encapsulation cap can be shaped under design aspects.

In accord with a further advantageous embodiment of the invention the holding arm is stamped as one piece simplifying the manufacture.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
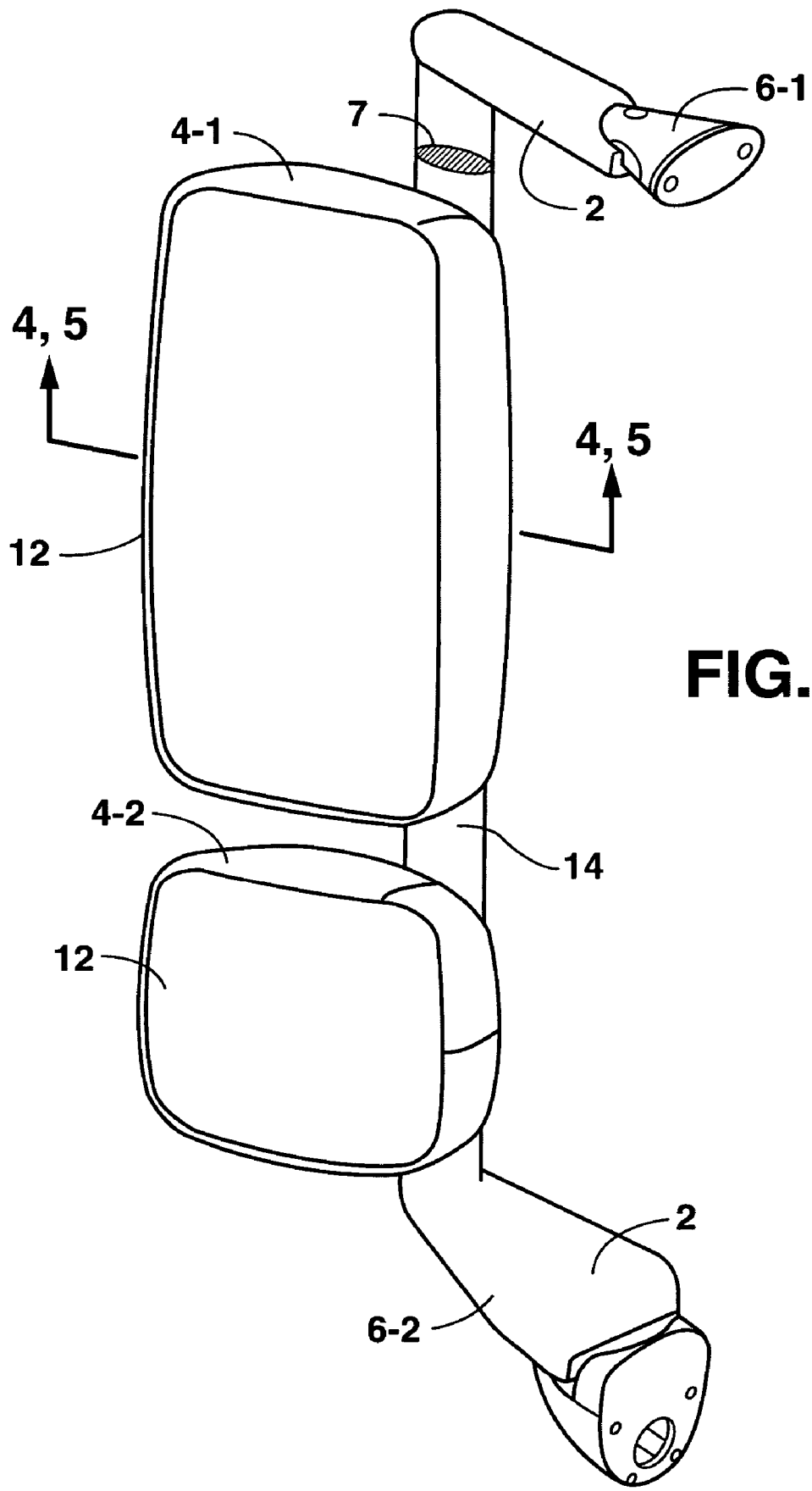
FIG. 1 is a front perspective view illustrating a first embodiment of a mirror assembly according to the invention.

FIGS. 1 through 4 illustrate a first embodiment of the invention. In particular, FIG. 1 shows a perspective view of an exterior mirror assembly for motor vehicles, namely for commercial vehicles, as it would be seen by a driver, designated generally as A. The exterior mirror encompasses a convex shaped holding arm 2 onto which a first mirror head 4-1 and a second mirror head 4-2 are mounted. Holding arm 2 possesses a first end 6-1 and a second end 6-2. The entire exterior mirror assembly can be fastened onto the motor vehicle with arm 2.

Figure 4:
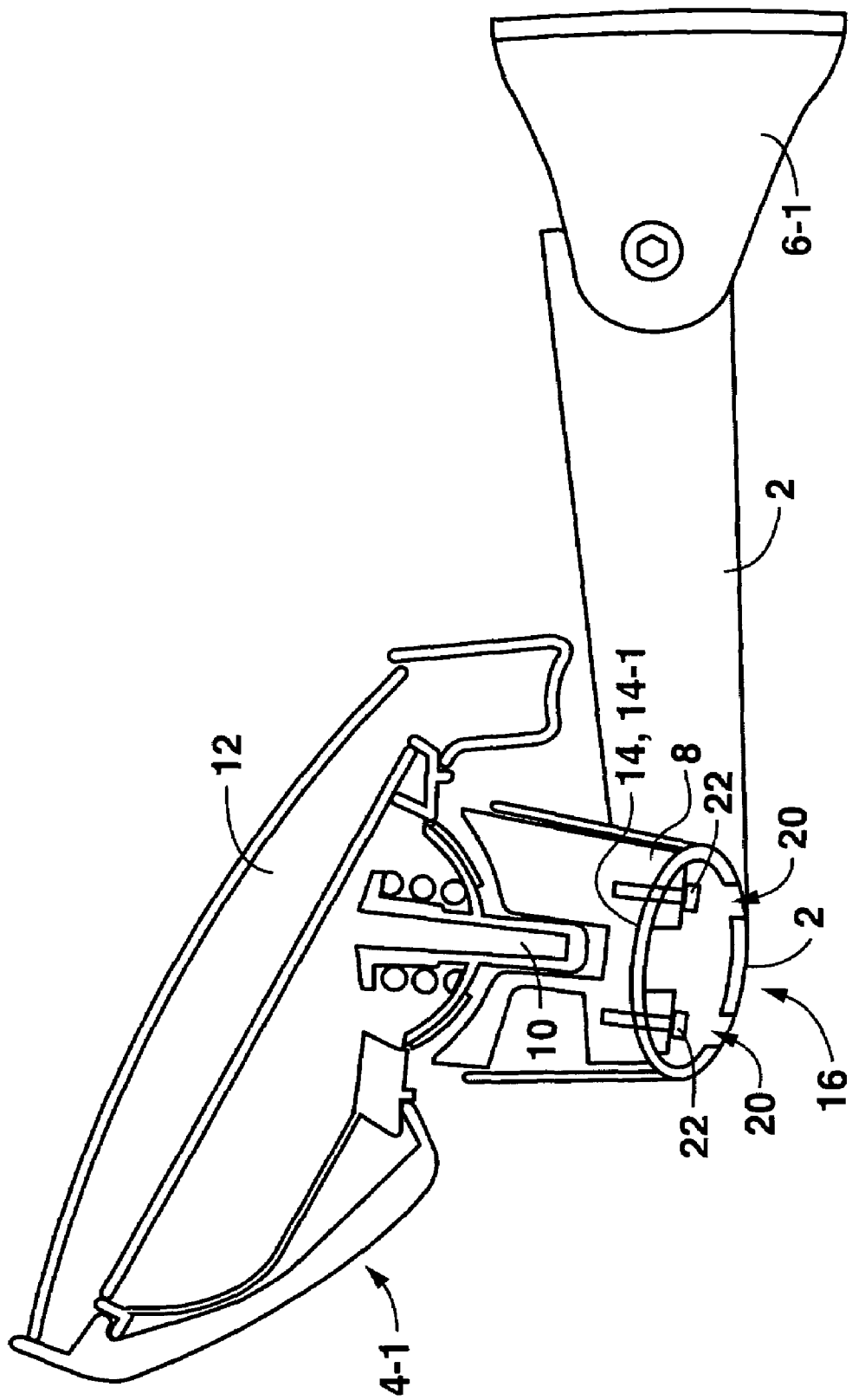
FIG. 4 is a sectional view taken along line 4-4 of FIG. 1.

Holding arm 2 is preferably an aluminum, hollow, structural member, with a convex and/or oval cross-section, indicated by the oval identified by reference number 7, as best can be seen in FIG. 4. As can best be seen in FIG. 3, the two mirror heads 4 are respectively, by means of a connection device 8, affixed to the holding arm 2. As may be inferred from FIG. 3, connection device 8 is connected with an electric motor powered mirror adjustment apparatus 10, which in turn, is connected with a mirror element 12.

Figure 2:
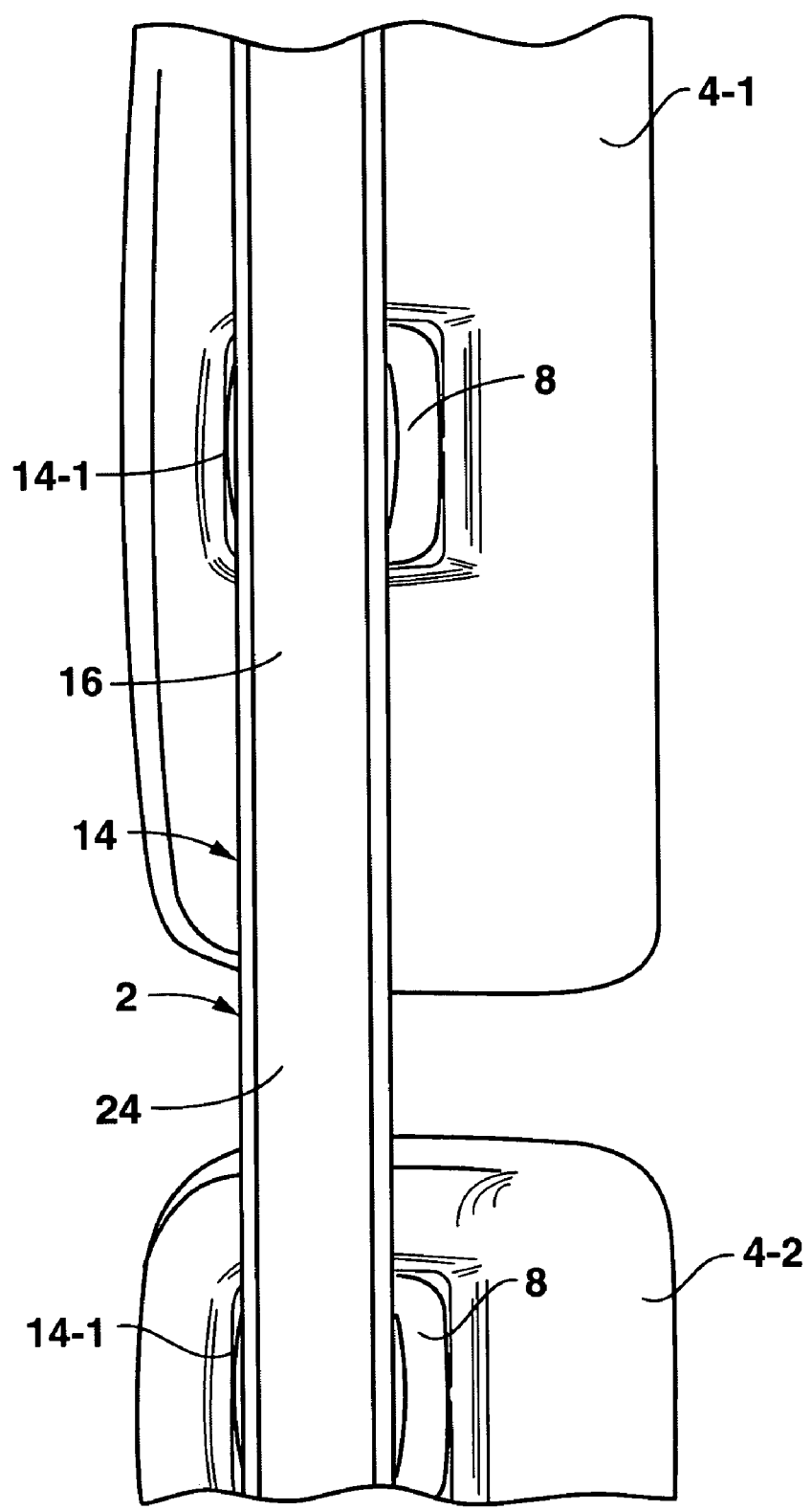
FIG. 2 is a rear perspective view of the embodiment of FIG. 1.
Figure 3:
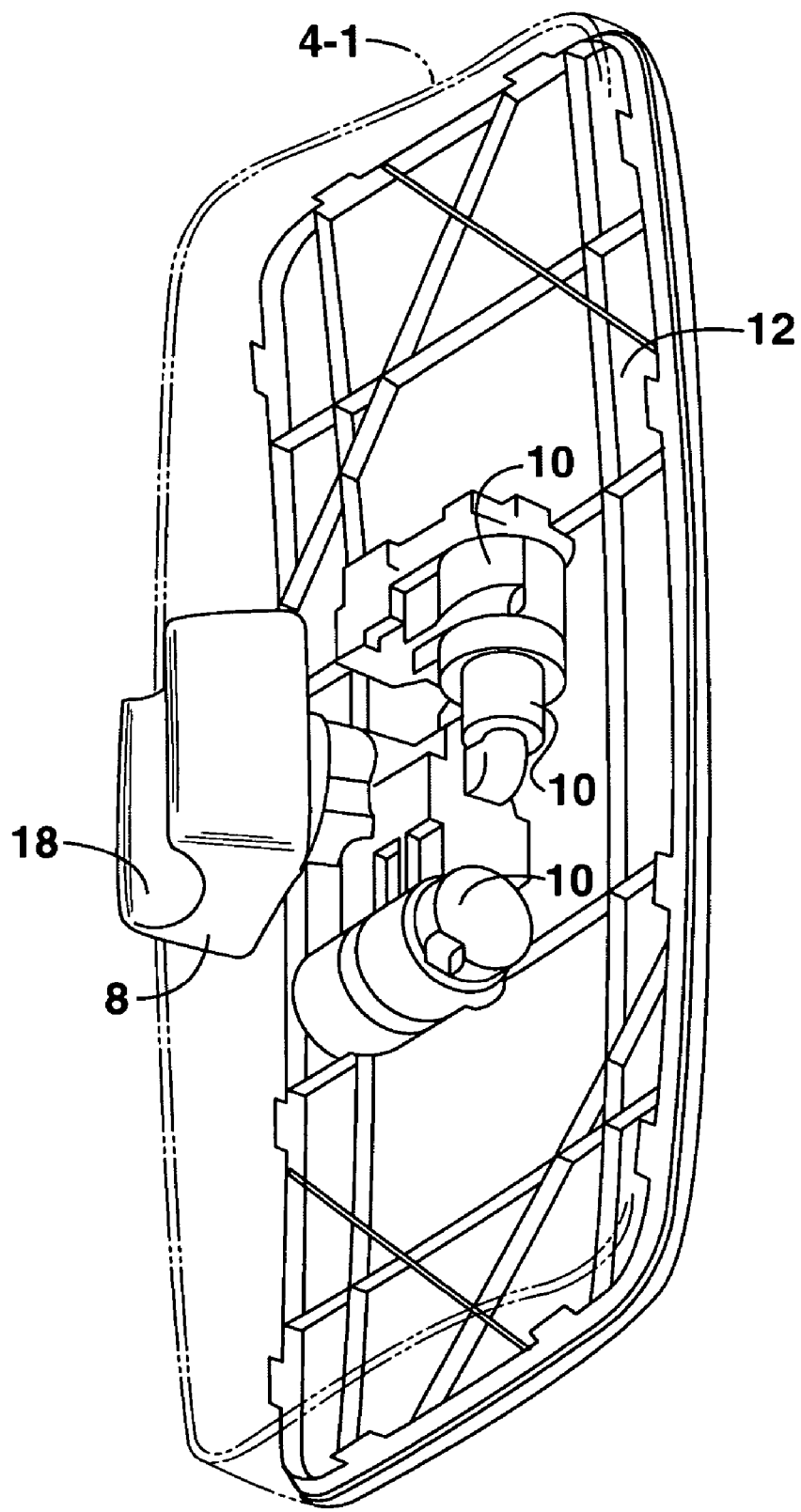
FIG. 3 is a rear perspective view of the embodiment of FIG. 1 illustrating a connection fitting according to the invention.

Holding arm 2 includes a mounting surface 14, which is convex to mirror head 4 and a side 16 which is likewise convex and is oppositely situated from mirror head 4. In this manner, mounting surface 14 is enlarged relative to a circular cross-section. Side 16 is remote from the mirror head and faces into the wind of travel. As may be seen in FIG. 3, connection device 8 includes an elongated oval half shell 18 which mates and covers a corresponding partial surface 14-1 of the mounting surface. As may be seen in FIG. 4, holding arm 2, in the area of the mounting surface 14-1, may be screwed together with oval half shell 18 of connection device 8 by means of fastener bores 20 in which screws 22 are inserted from the remote side 16. Bores 20 visible from remote side 16 of the mirror head may be covered by a lightweight, elongated encapsulation cap 24, as shown in FIG. 2, which is aerodynamically contoured. In the illustrated embodiment, encapsulation 24 cap covers the elongated vertical part of the holding arm, that is, the complete holding arm between its ends. Encapsulation cap 24 can be formed in the shape of a design, for example, it may be colored, or be different in material or surface structure than holding arm 2.

Figure 5:
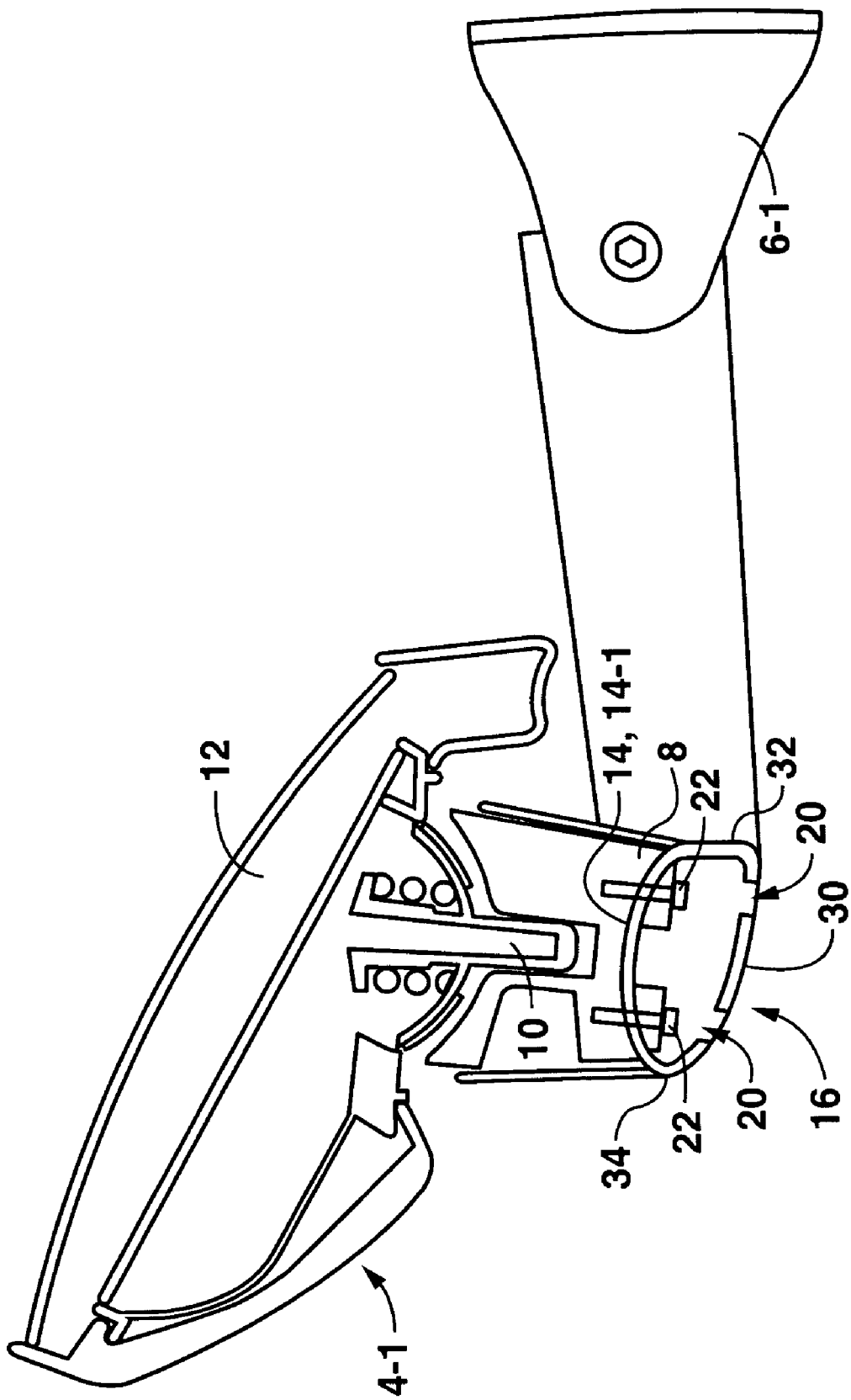
FIG. 5 is a sectional view, corresponding to FIG. 4, taken along line 5-5 of FIG. 1 illustrating a second embodiment of a mirror assembly having a holding arm connection according to the invention.

FIG. 5 shows a second embodiment in a corresponding sectional view of FIG. 4. This second embodiment includes a holding arm 30, which differs from the holding arm 2 of the first embodiment. In this case, the holding arm 30 includes for side 16 remote from the mirror head 4, a shape different from the oval aerodynamic shape. As seen in cross-section in FIG. 5, holding arm 30 is slightly wedge shaped. Holding arm 30 encompasses a longer wall 32 facing the vehicle and a shorter wall 34, remote from the vehicle. As for the remainder of the construction, this agrees with the convex embodiment design in accord with FIG. 4 which shows the first embodiment arm.

The differing aerodynamic shape can be attained through the form of holding arms 2; 30 themselves, or by an appropriate formation of encapsulation cap 24.

Thus, it can be seen that an advantageous construction and method for fastening mirror head(s) 4 onto holding arm 2, 30 can be had according to the invention which enables a very simple one-man mounting. Principally, the mirror head 4 is pressed in its entirety onto partial mounting surface 14-1 and then can be affixed by screws to holding arm 2, 30 from reverse side 16 of mirror head 4. Alternative to this, it is possible that the affixment by screw connection can be directed from mounting surface 14-1, in which case, however, only subsequent mounting of mirror element 12 in the mirror head becomes possible. However, the encapsulation cap can be omitted by this reverse screw installation since no borings penetrate holding arm 2, 30, and principally screw holes are placed in holding arm 2, 30.

While a preferred embodiment of the invention has been described using specific terms, such description is for illustrative purposes only, and it is to be understood that changes and variations may be made without departing from the spirit or scope of the following claims.

What is claimed is:

1. An exterior vehicle mirror assembly having a holding arm connection with reduced wind turbulence comprising:
   a holding arm having a first end and a second end for attachment to the vehicle;
   a mirror head carried by the holding arm having a mirror element;
   a connection device for connecting the mirror head to the holding arm;
   the holding arm having opposing convex sides including a convex mounting side and a convex wind encountering side, said convex mounting side providing an enlarged mounting surface disposed toward the mirror head;
   a connection device is disposed between the mirror head and the holding arm;
   the connection device having a contoured cradle for engaging the enlarged mounting surface of the convex mounting side of the holding arm with the opposing convex side of the holding arm being aerodynamically exposed to the on coming wind; and
   a fastener for tightly fastening the holding arm and connection device together so that a reliable connection with reduced turbulence is provided for the mirror head and the holding arm.

2. The assembly of claim 1 wherein the holding arm has an oval cross-section.

3. The assembly of claim 2 wherein the cross-section of the holding arm is narrower in the direction of mounting of the mirror head than in a transverse direction.

4. The assembly of claim 1 wherein the cross-section of the holding arm includes a longer wall facing generally towards the vehicle and a shorter wall facing generally away from the vehicle.

5. The assembly of claim 1 wherein the holding arm is a hollow extruded structural member.

6. The assembly of claim 1 including a plurality of fasteners penetrating the connection device in the direction of mounting for connecting the mirror head with the holding arm.

7. The assembly of claim 6 including a plurality of fastening bores formed in the holding arm for receiving the fasteners for penetrating into the connection device.

8. The assembly of claim 7 including an aerodynamic encapsulating cap extending generally a length of the holding arm for covering the fastener bores.

9. A method of connecting a holding arm to a mirror head in a vehicle mirror assembly for reducing wind turbulence comprising:

provproviding a holding arm having opposing convex sides including a convex mounting side and a convex wind encountering side, said convex mounting side providing an enlarged mounting surface disposed toward the mirror head;

providing a connection device having a contoured cradle for engaging the enlarged mounting surface of the convex mounting side of the holding arm with the opposing convex side of the holding arm being aerodynamically exposed to the on coming wind;

providing a fastener and tightly connecting the holding arm and the connection device together providing a reliable connection with reduced turbulence between the holding arm and the mirror housing so that the opposing convex side of the holding arm remains aerodynamically smooth;

whereby the enlarged mounting surface and contoured connection device cradle provide increased stability in the connection with reduced turbulence due to the convex opposing side.

* * * * *